United States Patent Office 3,161,768
Patented Dec. 15, 1964

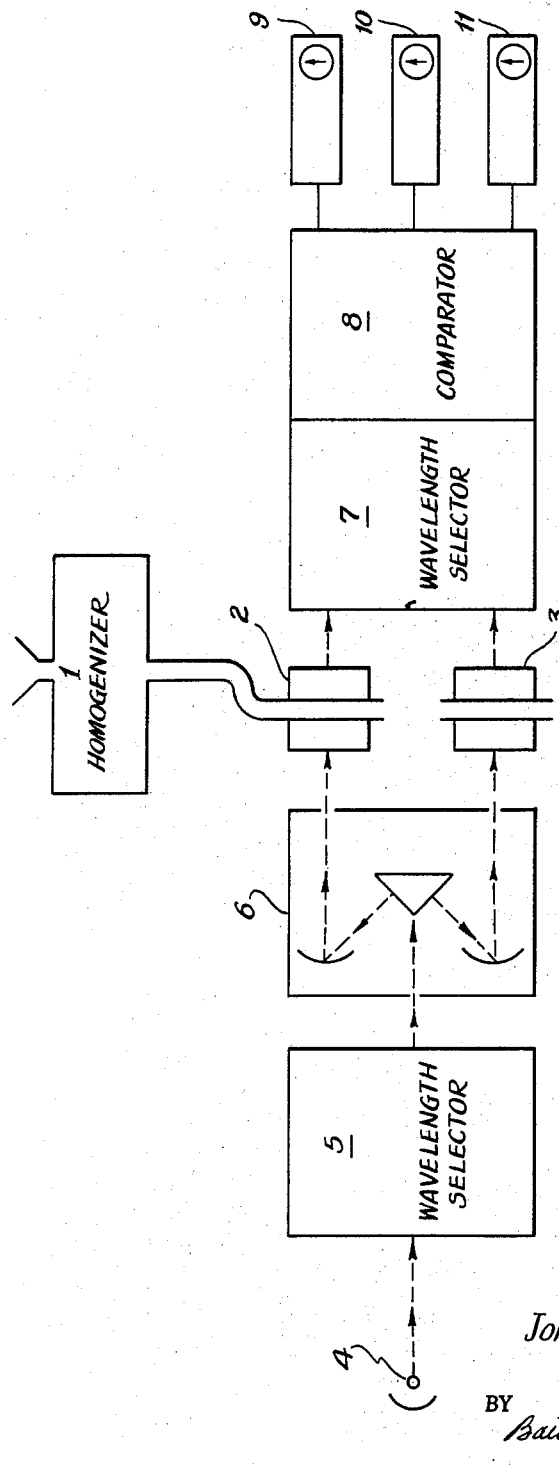

3,161,768
METHOD AND APPARATUS FOR THE ANALYSIS OF EMULSIONS AND SUSPENSIONS
John Desmond Spencer Goulden, Reading, England, assignor to National Research Development Corporation, London, England, a corporation of Great Britain
Filed Jan. 15, 1962, Ser. No. 166,342
Claims priority, application Great Britain, Jan. 27, 1961, 3,308/61; June 22, 1961, 22,692/61
8 Claims. (Cl. 250—43.5)

This invention relates to the analysis of emulsions and suspensions and is concerned with an infra-red absorption method for the estimation of the components of the disperse phase in an emulsion or suspension and apparatus therefor. This method is applicable to the determination of the suspended phase in oil-in-water emulsions and is particularly useful for the determination of the fat and protein content of milk and other related dairy products.

Turbidimetric methods for the determination of the suspended phase in emulsions or suspensions are known and generally are based on measurements of the optical density of the emulsion or suspension when examined with visible and near infra-red radiation (0.5–1.0$\mu$ wavelength). The results obtained with the use of such short wavelength incident light are dependent not only upon the concentration of the suspended phase but upon the scattering effect which is itself due to the particle size of the suspended phase. Thus in most methods, in order to reduce the effects of scattering due to varying particle size it has hitherto been essential to ensure that a constant degree of homogenization of the emulsion is brought about, or alternatively, measurements of the optical density at several wavelengths are needed to allow for changes in particle size.

It is known that if a beam of radiation is passed through a cell containing an emulsion or suspension, attenuation of the beam occurs and is due to both absorption and scattering effects. It has now been found that quantitative absorption measurements on such a system are reliable only when the effects of scattering are made small in comparison with those of absorption, i.e., when the refractive index ratio of the two phases approaches unity and when the particle size of the suspended phase is considerably smaller than the wavelength of the incident radiation. Thus, if a wavelength is selected where the suspended phase shows an absorption band and if the suspended particle size is substantially less than this wavelength, the radiation attenuation is largely dependent upon the concentration of the suspended phase.

According to the invention there is provided a method for the quantitative estimation of the disperse phase in an emulsion or suspension which comprises subjecting a cell containing the emulsion or suspension to infra-red radiation which includes a selected infra-red peak absorption wavelength of the said disperse phase and which is absorbed more strongly by the disperse phase than by the dispersion medium and using the radiation absorbed to indicate the amount of the disperse phase present and ensuring that the particle size of substantially all the disperse phase is sufficiently smaller than the selected wavelength to substantially reduce the scattering effect.

According to another feature of the invention there is provided a method for the quantitative estimation of the component or components of the disperse phase or phases of an emulsion or suspension which comprises subjecting a cell containing the emulsion or suspension to infra-red radiation whose wavelength range is such as to include selected infra-red peak absorption wavelengths of the said component or components and which radiation is absorbed more strongly by the said component or components at the respective selected peak absorption wavelength than by the dispersion medium, and using the radiation absorbed to indicate the amount of the respective component present and ensuring that the particle size of substantially all the disperse phase is sufficiently smaller than the selected wavelength to substantially reduce the scattering effect.

The expression dispersion medium is to be construed as referring to the medium in which the component or components of the emulsion or suspension are dissolved or suspended, and, in the case in which the dispersion medium is itself a solution of one or more of the said components in a solid, then as referring to the solvent itself.

In the case of most emulsions, e.g., milk it will be necessary to homogenize the material to reduce the particle size sufficiently before testing absorptiometrically. This reduction in particle size is carried out where required by homogenization using known methods. Provided the mean particle diameter is sufficiently small, preferably not greater than about ⅓ of the wavelength employed, variations in the actual diameters of the particles can be tolerated, since the amount of radiation lost by scattering is small compared with the amount absorbed. Thus no special limitations are placed on the performance of the homogenizer and the analytical results obtained are much less dependent upon the homogenization conditions than is the case with prior turbidimetric methods.

According to one embodiment of the invention there is provided a method for the quantitative estimation of fat in milk which comprises subjecting a cell containing the homogenized milk to infra-red radiation which radiation includes a selected infra-red peak absorption wavelength of the fat and which radiation is absorbed more strongly by the fat at its selected peak absorption wavelength than by the remaining components of the milk and using the radiation absorbed to indicate the amount of the fat present and ensuring that the degree of homogenization of the milk is such that the particle size of substantially all the disperse phase is sufficiently smaller than the selected wavelength to substantially reduce the scattering effect.

For the analysis of aqueous emulsions or suspensions the choice of a suitable wavelength of the radiation is restricted to regions of the infra-red spectrum where water is relatively non-absorptive of infra-red radiation. Water is partially transparent to infra-red radiation in the regions 3.5–5.8$\mu$ and from 6.5–10.5$\mu$. Thus for oil-in-water emulsions the most convenient oil absorption bands will be those near 5.8$\mu$ and 7.2$\mu$ the former wavelength only being applicable to glyceride oils.

Since in practice it is often impossible to use wavelengths at which the absorption of the dispersion medium is negligible, the absorption of the dispersion medium is normally allowed for by making measurements of the emulsion absorption against a sample of the dispersion medium. In regions of intense water absorption, the optimum optical path length must be determined by experiment but will usually be from 10–100$\mu$. For example, in the analysis of milk an optical path length of the order of 50$\mu$ is found to be highly convenient.

The infra-red spectrum of homogenized milk shows absorption bands at 5.8, 6.5 and 9.6$\mu$ due to the fat, protein and lactose constituents respectively and thus gives rise to a method for a complete analysis of milk in respect of these three constituents as the optical density when measured at these wavelengths is proportional to the concentration of the respective constituent.

According to a second embodiment of the invention there is provided a method for the quantitative estimation of fat and protein in milk which comprises subjecting a cell containing the homogenized milk to infra-red radiation whose wavelength range is such as to include lected infra-red peak absorption wavelengths of the fat and protein components and which radiation is absorbed more strongly by each component at its selected peak wavelength than by the remaining components of the milk and using the radiation absorbed to indicate the amount of the respective component present and ensuring that the degree of homogenization of the milk is such that the particle size of substantially all the disperse phase is sufficiently smaller than the selected wavelength to substantially reduce the scattering effect.

According to a third embodiment of the invention there provided a method for the quantitative estimation of fat, protein and lactose in milk which comprises subjecting a cell containing homogenized milk to infra-red radiation whose wavelength range is such as to include selected infra-red peak absorption wavelengths of the fat, protein and lactose components and which radiation is absorbed more strongly by each component at its selected peak absorption wavelength than by the remaining components of the milk and using the radiation absorbed to indicate the amount of the respective component present and ensuring that the degree of homogenization of the milk is such that the particle size of substantially all the disperse phase is sufficiently smaller than the selected wavelengths to substantially reduce the scattering effect.

With the exception of the contribution of the protein absorption to the $9.6\mu$ lactose peak absorption wavelength, all the interaction coefficients were found to be negative, indicating that the non-absorbing component had an apparent negative absorption effect due to displacement of the more intensely absorbing water molecules.

It is found in the estimation of the fat, protein and lactose constituents by the methods of the invention that a correction has to be applied due to the absorption interaction between the fat and protein constituents. This correction, necessary in the measurement of the absorption of infra-red radiation by protein at its peak absorption wavelength of $6.5\mu$ and which is due to absorption of radiation by the fat constituent is made by making due allowance for the variation in fat concentration as measured by the optical density of the fat constituent at $5.8\mu$.

It must be remembered that when submitting the milk to infra-red radiation the infra-red absorption due to the water at the absorption peak wavelengths of the said constituents, is so intense that only a few percent of the total radiation is transmitted.

Examination of a series of milk samples from 20 cows of different breeds and in different states of lactation gave results for the fat, protein and lactose concentrations when estimated by the method of the invention, which were found to have respective coefficients of variation of 2½%, 3% and 2½% from the concentrations actually existing, i.e., as determined by chemical analysis. It is considered that these errors may be reduced by the application of further corrections as analysis of synthetic milk samples made by mixing varying amounts of cream and separated milk from the same bulk milk sample gave a correlation between fat percentage and optical density when measured at $5.8\mu$ which approached the limit of photometric accuracy, i.e., ±1%.

According to a third feature of the invention there is provided apparatus for the quantitative estimation of the component or components of the disperse phase or phases of an emulsion or suspension which comprises a source of infra-red radiation, means for optically splitting the infra-red radiation into the selected infra-red absorption wavelength bands of the said components and means for enabling the amount of the said component or components present as determined by the absorption at the selected wavelength band to be read off or recorded.

According to an embodiment of the third feature of the invention there is provided apparatus for the quantitative estimation of the component or components of the disperse phase or phases of an emulsion or suspension, which comprises a homogenizer adapted to reduce the particle size of the emulsion or suspension, a source of infra-red radiation, means for optically splitting the infra-red radiation into the selected infra-red absorption wavelength bands of the said components and means for enabling the amounts of the said component or components present as determined by the absorption at the selected wavelength band, to be read off or recorded.

According to a further embodiment of the third feature of the invention there is provided apparatus for the quantitative estimation of the component or components of the disperse phase or phases of an emulsion or suspension, which comprises a homogenizer, a source of infra-red radiation, means for optically splitting the infra-red radiation into the selected infra-red absorption wavelength bands of the said components, the said homogenizer being adapted to reduce the mean particle diameter of the emulsion or suspension to a value of not greater than one third of the selected absorption wavelength band employed, and means for enabling the amounts of the said component or components present as determined by the absorption at the selected wavelength band, to be read off or recorded.

In the use of the apparatus in applying the method of the invention to milk the homogenized milk samples were examined in a cell of pathlength of $52\mu$, a similar cell containing water being placed in the solvent position in a double beam spectrometer fitted with stray radiation filters. Although the measured peak optical densities were only in the region of 0.2, little improvement was obtained in increasing the pathlength since the reduced solvent transmission necessitated the use of a larger slit width causing a decrease in resolution and an increase in stray radiation.

In the estimation of the fat content of homogenized milk in accordance with the method of the invention, it is found that when the milk is subjected to infra-red radiation at a wavelength of $5.8\mu$ the optical density as a result thereof is independent of the homogenization pressure within the limits of experimental error as indicated below:

| Homogenization Pressure (p.s.i.) | Mean Fat Globule Diameter ($\mu$) | Optical Density (at $5.8\mu$) |
| --- | --- | --- |
| 3,000 | 0.46 | 0.245 |
| 2,000 | 0.64 | 0.244 |
| 1,000 | 0.85 | 0.243 |
| 800 | 1.0 | 0.247 |

These results were obtained with a standard double beam infra-red spectrophotometer having an optical pathlength of $54\mu$ using optical cells with calcium fluoride windows.

Also, these results show that at homogenization pressures within the range of from 800 to 3,000 p.s.i., the means fat particle size of homogenized milk is equal to or less than $1\mu$ i.e., it is substantially less than the wavelength of $5.8\mu$ of the incident infra-red radiation.

The reliability of the infra-red absorption method for measurement of optical density in the estimation of the fat content in milk has been determined for a range of fat concentration of between 1 and 10% and over this range it is found that the optical density is proportional to the fat content to within an accuracy of approximately 2% as is indicated in the following table:

| Percent fat | Optical Density (D) at $5.8\mu$ | Fat percent, D |
| --- | --- | --- |
| 9.10 | 0.523 | 17.4 |
| 7.05 | 0.423 | 16.7 |
| 5.28 | 0.303 | 17.4 |
| 3.70 | 0.212 | 17.4 |
| 1.32 | 0.082 | 16.5 |

This proportionality between fat content and optical density was demonstrated by the analysis of synthetic homogenized milk samples, prepared by mixing cream and separated milk in suitable proportions.

One embodiment of the invention will now be described with reference to the accompanying drawing which shows a diagrammatic representation of an arrangement of the apparatus for carrying out the method of the invention.

In the arrangement as shown in the diagram a homogenizer 1 is positioned for homogenizing the emulsion or suspension and transferring the homogenized sample to a sample cell 2. A comparison cell 3 contains a sample of the dispersion medium of the emulsion or suspension under test, as a comparator blank sample. A source of infra-red radiation 4 is provided for incidence upon a wavelength filter means or wavelength range selector 5. A radiation beam splitter 6 divides the resulting infra-red radiation consisting of either a selected wavelength or a specific wavelength into two paths, one passing through the sample cell 2 and the other passing through the sample cell 3. A monochromator 7 divides the infra-red radiation transmitted by the test sample and blank sample contained in the cells 2 and 3 respectively into the absorption wavelength bands of the respective components of the disperse phase of the emulsion or suspension which are compared in comparator 8 and read out in circuits 9, 10 and 11 are placed at the peak absorption wavelength positions of the respective bands. These read out circuits 9, 10 and 11 enable the amounts of the components present to be read off or recorded.

I claim:

1. A method for the quantitative estimation of the disperse phase of a mixture selected from emulsions and suspensions which comprises:
    (a) providing a source of infra-red radiation,
    (b) selecting a range of wavelength of radiation from said source which includes a selected peak absorption wavelength of said disperse phase where absorption by said disperse phase is stronger than absorption by its dispersing medium,
    (c) providing a mean particle size of the disperse phase which is less than the selected peak absorption wavelength of said disperse phase,
    (d) passing the selected infra-red radiation through the mixture to the analyzed and
    (e) measuring the radiation absorbed by the disperse phase at the selected peak absorption wavelength.

2. A method for the quantitative estimation of a plurality of disperse phases of a mixture selected from emulsions and suspensions which comprises:
    (a) providing a source of infra-red radiation,
    (b) selecting ranges of wavelengths of radiation from said source which includes selected peak absorption wavelengths for each disperse phase to be analyzed where absorption by the disperse phase is stronger than absorption by the dispersing medium,
    (c) providing a mean particle size of each disperse phase which is less than the selected peak absorption wavelength of each said disperse phase,
    (d) passing the selected infra-red radiation from the source provided through the mixture to be analyzed and
    (e) measuring the radiation absorbed by each disperse phase at the selected peak absorption wavelengths.

3. A method as in claim 1 wherein the disperse phase quantitatively estimated is fat in milk.

4. A method for the quantitative estimation of fat and protein in milk which comprises:
    (a) providing a source of infra-red radiation,
    (b) selecting ranges of wavelengths of radiation from said source which includes selected peak absorption wavelengths for the fat and protein where absorption by the fat and protein is stronger than absorption by the dispersing medium,
    (c) providing a mean particle size for each disperse phase present in the milk which is less than each of said selected peak absorption wavelengths of step b,
    (d) passing the selected infra-red radiation through the milk and
    (e) measuring the radiation absorbed by the fat and protein at the selected peak absorption wavelengths.

5. A method for the quantitative estimation of fat, protein and lactose in milk which comprises:
    (a) providing a source of infra-red radiation,
    (b) selecting ranges of wavelengths of radiation from said source which includes selected peak absorption wavelengths for the fat, protein and lactose where absorption by the fat, protein and lactose is stronger than the dispersing medium,
    (c) providing a mean particle size for each disperse phase present in the milk which is less than each of said selected peak absorption wavelengths of step b,
    (d) passing the selected infra-red radiation through the milk and
    (e) measuring the radiation absorbed by the fat, protein and lactose at the selected peak absorption wavelengths.

6. A method for the quantitative estimation of fat, protein and lactose in milk as in claim 5 wherein the selected peak absorption wavelengths of step b are 5.8, 6.5 and 9.6 microns for the fat, protein and lactose respectively.

7. Apparatus for the quantitative estimation of a disperse phase of a mixture selected from the group consisting of emulsions and suspensions which comprises in combination,
    (a) a source of infra-red radiation,
    (b) a filter means to provide a range of wavelengths from said source which includes a selected peak absorption wavelength of more than 0.6 micron of said disperse phase where absorption by said disperse phase is stronger than absorption by its dispersing medium,
    (c) radiation splitting means for dividing the infra-red radiation into two paths,
    (d) a first sample cell located in one of the resulting radiation paths to contain a sample to be analyzed,
    (e) a second cell located in the other of said resulting radiation paths to contain a sample of the dispersion medium of said mixture,
    (f) means to provide in the first cell a particle size range of dispersed phase which is less than a wavelength where peak radiation absorption of the phase occurs,
    (g) means to divide the infra-red radiation transmitted through said cells into a selected peak absorption wavelength band of said phase, and
    (h) means for measuring and comparing the radiation absorbed by the two cells at a selected peak absorption wavelength.

8. Apparatus for quantitative estimation of fat, protein and lactose in milk which comprises in combination,
    (a) a source of infra-red radiation,
    (b) monochromators to provide from said source ranges of wavelengths of 3.5–5.8 microns and 6.5–10.5 microns,
    (c) radiation splitting means for dividing the infra-red radiation into two paths,
    (d) a first sample cell having a path length of up to 0.1 millimeter to contain a sample to be analyzed,
    (e) a second sample cell located in the other of said resulting radiation paths to contain a sample of the dispersion medium of said mixture,
    (f) a homogenizer to provide in the first sample cell a particle size range of the dispersed fat, protein and lactose which is about 0.4 to 4.0 microns,
    (g) a wavelength divider to provide selected peak absorption wavelengths of 5.8, 6.5 and 9.6 microns for the fat, protein and lactose respectively, and
    (h) means to measure and compare the infra-red radiation absorbed by the two cells at the selected peak absorption wavelengths of $(g)$.

References Cited by the Examiner

UNITED STATES PATENTS 2,547,212  4/51   Jamison et al. _____ 250—43.5 X
2,752,815  7/56   Batchelor _____ 88—14
2,765,409  10/56  Hutchins et al. _____ 250—43.5
2,844,067  7/58   Borg _____ 88—14
2,844,729  7/58   Winterling et al. _____ 250—43.5
2,951,939  9/60   Luft _____ 250—43.5
3,029,682  4/62   Wood _____ 250—43.5

RALPH G. NILSON, *Primary Examiner.*